United States Patent
Cheng

(10) Patent No.: US 10,550,636 B2
(45) Date of Patent: Feb. 4, 2020

(54) SCREWLESS CURTAIN CONTROL ASSEMBLY

(71) Applicant: CHEN TIAN CO., LTD., Tainan (TW)

(72) Inventor: Ching-Hsiang Cheng, Tainan (TW)

(73) Assignee: Chen Tian Co., Ltd., Tainan (TW)

( * ) Notice: Subject to any disclaimer, the term of this patent is extended or adjusted under 35 U.S.C. 154(b) by 50 days.

(21) Appl. No.: 15/887,000

(22) Filed: Feb. 2, 2018

(65) Prior Publication Data

US 2019/0128058 A1     May 2, 2019

(30) Foreign Application Priority Data

Nov. 2, 2017    (TW) .............................. 106137998 A

(51) Int. Cl.
| | |
|---|---|
| *E06B 9/322* | (2006.01) |
| *F16D 51/04* | (2006.01) |
| *F16H 1/28* | (2006.01) |
| *E06B 9/78* | (2006.01) |

(52) U.S. Cl.
CPC ............... *E06B 9/322* (2013.01); *E06B 9/78* (2013.01); *F16D 51/04* (2013.01); *F16H 1/28* (2013.01)

(58) Field of Classification Search
CPC . E06B 9/322; E06B 9/78; F16D 51/04; F16H 1/28
See application file for complete search history.

(56) References Cited

U.S. PATENT DOCUMENTS

2006/0272783 A1* 12/2006 Smith ..................... E06B 9/262
                                                                       160/121.1

FOREIGN PATENT DOCUMENTS

TW          M263878 U      5/2005

* cited by examiner

*Primary Examiner* — Mark J Beauchaine
(74) *Attorney, Agent, or Firm* — Rosenberg, Klein & Lee

(57) ABSTRACT

A screwless curtain control assembly is revealed. An assembly segment is disposed on one end of a bead chain base while first radial positioning parts and first axial positioning parts are arranged at the assembly segment alternately. A sleeve including second radial positioning parts and second axial positioning parts is mounted to the assembly segment of the bead chain base. Thereby the bead chain base and the sleeve are connected stably by the first radial positioning parts and the first axial positioning parts connected to and positioned by the second radial positioning parts and second axial positioning parts respectively. Thus both labor time for fastening screws and cost of the screws are saved. Therefore the screwless curtain control assembly meets the modern industry's requirement for high efficiency at low cost.

8 Claims, 6 Drawing Sheets

SCREWLESS CURTAIN CONTROL ASSEMBLY

BACKGROUND OF THE INVENTION

Field of the Invention

The present invention relates to a screwless curtain control assembly, especially to a screwless curtain control assembly in which fasteners such as screws are replaced by positioning parts engaged with and mounted within each other for improving the assembling efficiency and saving the cost of the screws.

Description of Related Art

Refer to Taiwanese. Pat. Pub. No. M263878U, a control device of a curtain bead chain for opening and closing curtains is revealed. The components of the control device of the curtain bead chain such as a fixing base, a blind brake, planet gears, etc. are assembled manually. The threaded holes of the components are aligned and screws are passed through the threaded holes one by one for connecting the fixing base, the blind brake and the planet gears. Thus the assembly process of the components is time-consuming and the cost of the screws is required. The design doesn't meet the requirement of modern industry for high productivity at low cost.

SUMMARY OF THE INVENTION

Therefore it is a primary object of the present invention to provide a screwless curtain control assembly in which components are joined by the first radial positioning parts engaged with the second radial positioning parts and the first axial positioning parts mounted within the second axial positioning parts instead of fasteners such as screws for increasing the assembling efficiency and reducing the cost of material preparation.

In order to achieve the above object, a screwless curtain control assembly according to the present invention mainly includes a bead chain base, a first driving member, a second driving member, and a sleeve. An assembly segment is disposed on one end of the bead chain base while a plurality of first radial positioning parts and a plurality of first axial positioning parts are arranged at the assembly segment alternately. The first driving member is fit on the assembly segment. One end of the first driving member is connected to a toothed bar. The second driving member includes a toothed part engaged with the toothed bar of the first driving member, and an assembly end affixed to one end thereof. The sleeve consists of a second cavity, a through hole located on a center of the bottom of the second cavity, a plurality of second radial positioning parts arranged at one end thereof with an opening of the second cavity, and a plurality of second axial positioning parts arranged adjacent to the second radial positioning parts. The first driving member and the second driving member are mounted within the second cavity while the assembly end of the second driving member is passed through the insertion hole and extended from the sleeve. The second radial positioning parts are engaged with and positioned by the first radial positioning parts of the bead chain base respectively while the first axial positioning parts are mounted within and positioned by the second axial positioning parts of the bead chain base respectively.

The first positioning part of the bead china base includes two opposite pieces and a dovetail groove formed between the two pieces. The second radial positioning part of the sleeve is arranged with a dovetail piece extended from one end of the sleeve with an opening of the second cavity. The dovetail piece of the second radial positioning part of the sleeve is mounted within and engaged with the dovetail groove of the first radial positioning part of the bead chain base correspondingly. An indentation is formed between the two adjacent pieces of the second radial positioning parts of the sleeve and corresponding to the piece. Thus the piece of the first radial positioning part of the bead chain base is engaged with the indentation.

The first axial positioning part of the bead chain base is an a locking pin arranged at the assembly segment of the bead chain base while the second axial positioning part of the sleeve is a locking hole disposed on a wall of the sleeve. The locking pin of the bead chain base is aligned with and inserted within the locking hole of the sleeve correspondingly to be positioned.

The second axial positioning part of the sleeve, a locking hole, is corresponding to the piece of the second radial positioning part of the sleeve. A guiding groove is formed on the inner surface of the piece and is extended from the rear end of the piece to the locking hole along the direction of the long side of the piece. A guiding slope is formed on the wall at one end of the guiding groove adjacent to the locking hole. Thus the locking pin is passed through the guiding groove and guided by the guiding slope to be mounted within and positioned by the locking hole.

The second driving member includes an assembly base and a plurality of planet gears disposed around the assembly base. The toothed bar of the first driving member is located at the center of the planet gears and teeth on an inner side of the planet gear form the toothed part that is engaged with the toothed bar. An internally-toothed annular portion is formed on a wall of the second cavity of the sleeve and engaged with teeth on an outer side of the planet gears. An assembly end is set on one end of the assembly base, opposite to the end with the planet gears. The assembly end is extended from the insertion hole on the bottom of the second cavity of the sleeve.

A plurality of assembly pieces is arranged around the assembly base of the second driving member with an interval therebetween. A fixing part is projecting from a rear end of the assembly piece. A shaft is disposed on the interval between the two adjacent assembly pieces and the respective planet gear is disposed on the corresponding shaft. The second driving member further includes a fixing disc arranged with a through hole at a center thereof, a plurality of first fixing holes and a plurality of second fixing holes. The first fixing holes and the second fixing holes are disposed around the through hole of the fixing disc alternately with an interval between the two adjacent fixing holes. The toothed bar of the first driving member is passed through the through hole of the fixing disc so that the fixing disc is attached to the end of the first driving member with the toothed bar. The fixing parts on the assembly pieces of the assembly base are plugged into the first fixing holes of the fixing disc while an end of the shaft is inserted into the second fixing hole to be positioned.

The assembly segment of the bead chain includes a plurality of assembly parts coaxially arranged, connected in turn and having smaller diameter in turn. The first radial positioning parts and the first axial positioning parts are disposed on the two adjacent assembly parts respectively and a brake set is arranged at the assembly part with the shortest diameter. The barking set consists of two brake springs and a brake tube. The two brake springs are fit around the assembly part with the shortest diameter. Each of two ends of the brake spring is bent to form a terminal. A chamber is formed in the brake tube for mounting the assembly part with the shortest diameter and the brake springs therein. An opening is formed on one side of the brake tube and communicated with the chamber. Two terminals of the brake spring are against two sides of the opening respectively for positioning. A first cavity is formed in the first driving member and used for mounting the braking set therein. A stopping segment is projecting from a side wall of the first cavity in the direction of the long side and located between the two terminals of the brake spring to push against the two terminals of the brake spring correspondingly.

A polygonal connection hole is set on an end part of the assembly end of the second driving member.

Thereby the sleeve and the bead chain base are firmly connected by the pieces of the second radial positioning parts of the sleeve engaged with the grooves of the bead chain base and the locking pins of the bead chain base mounted within the locking holes of the sleeve. Both time spent on fastening screws one by one and cost of the screws can be saved. The manufacturers' needs for high productivity at low cost can be met.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
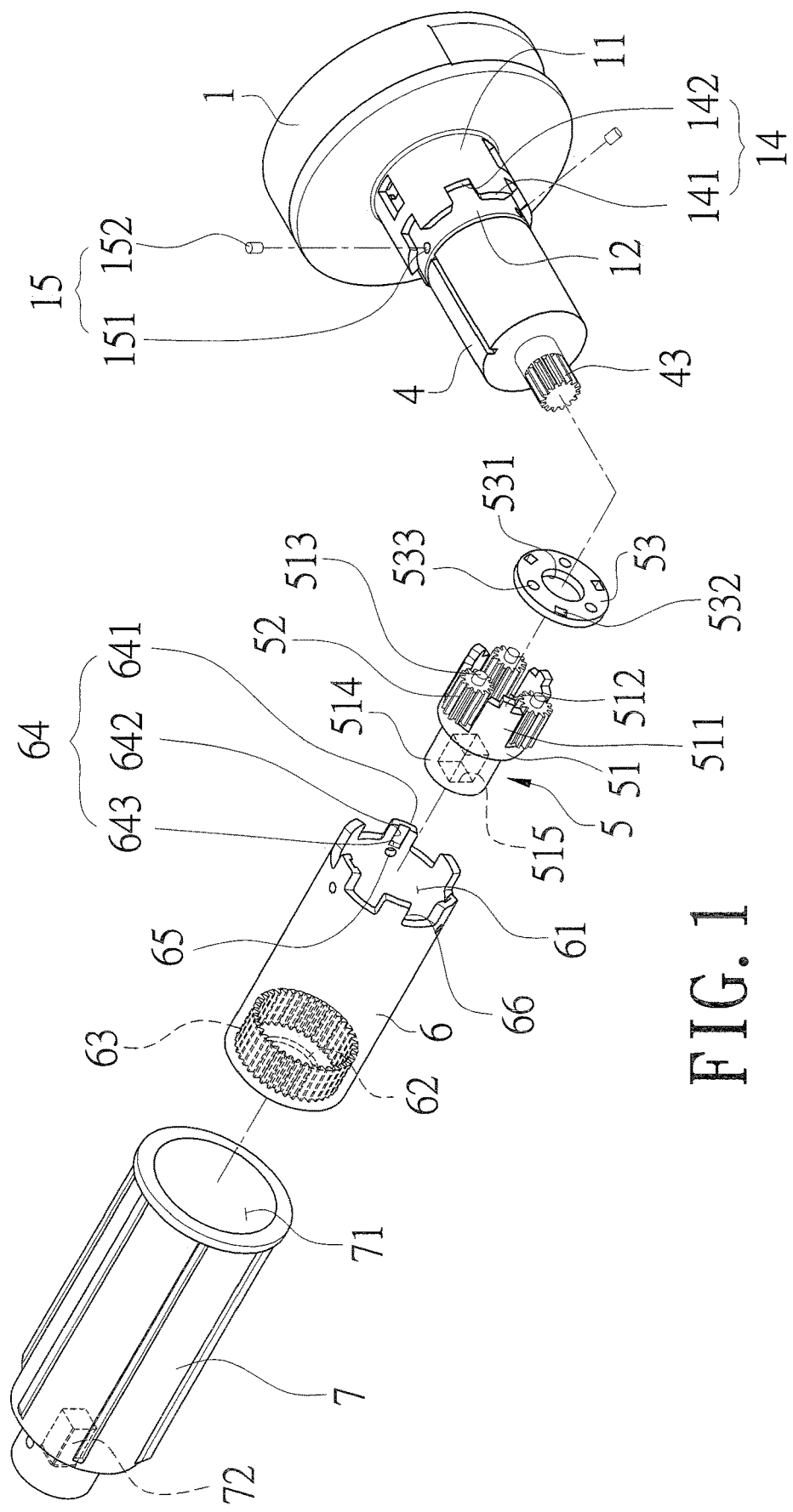
FIG. 1 is a an explosive view of an embodiment according to the present invention.
Figure 2:
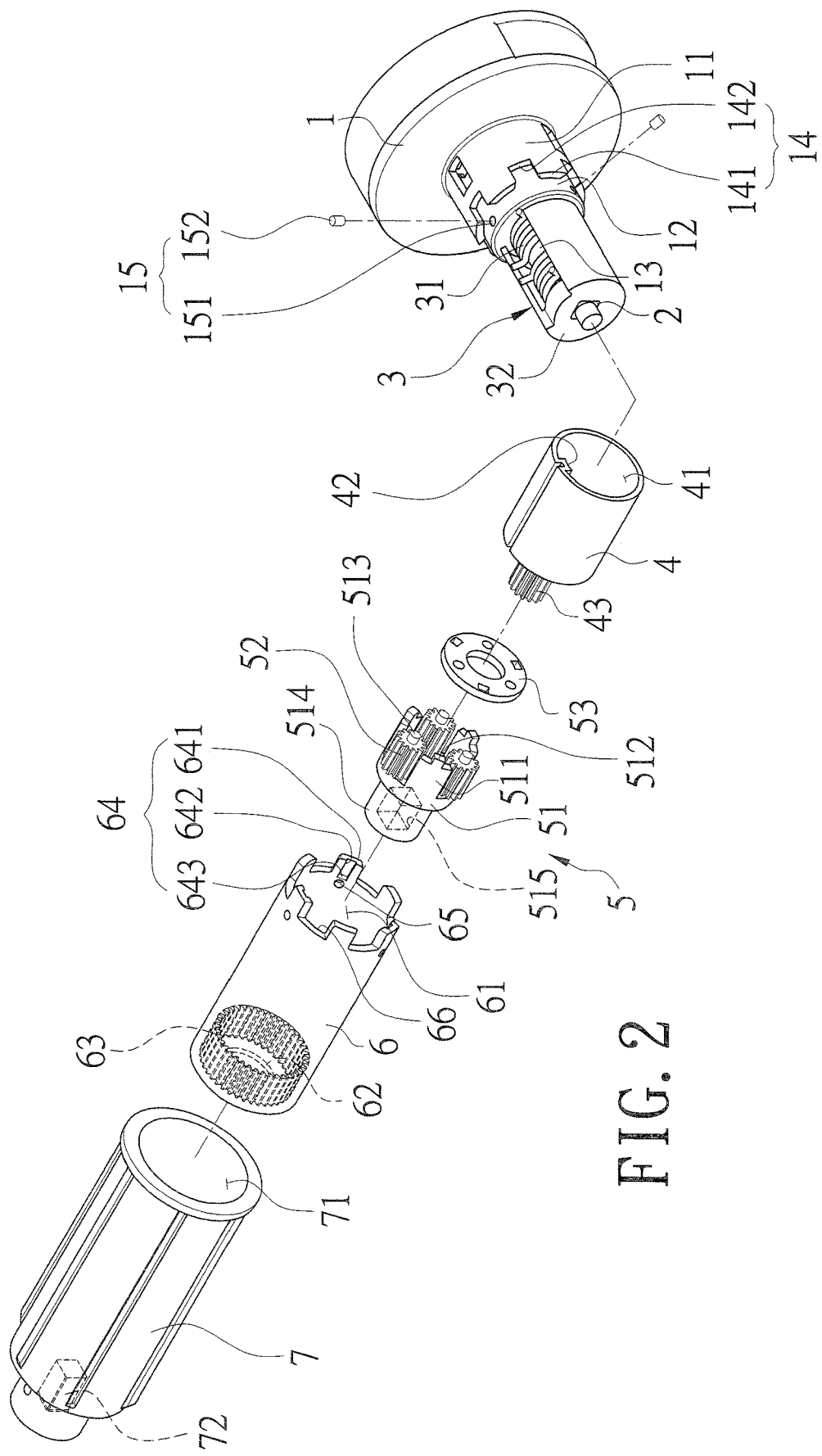
FIG. 2 is another explosive view of an embodiment according to the present invention.
Figure 3:
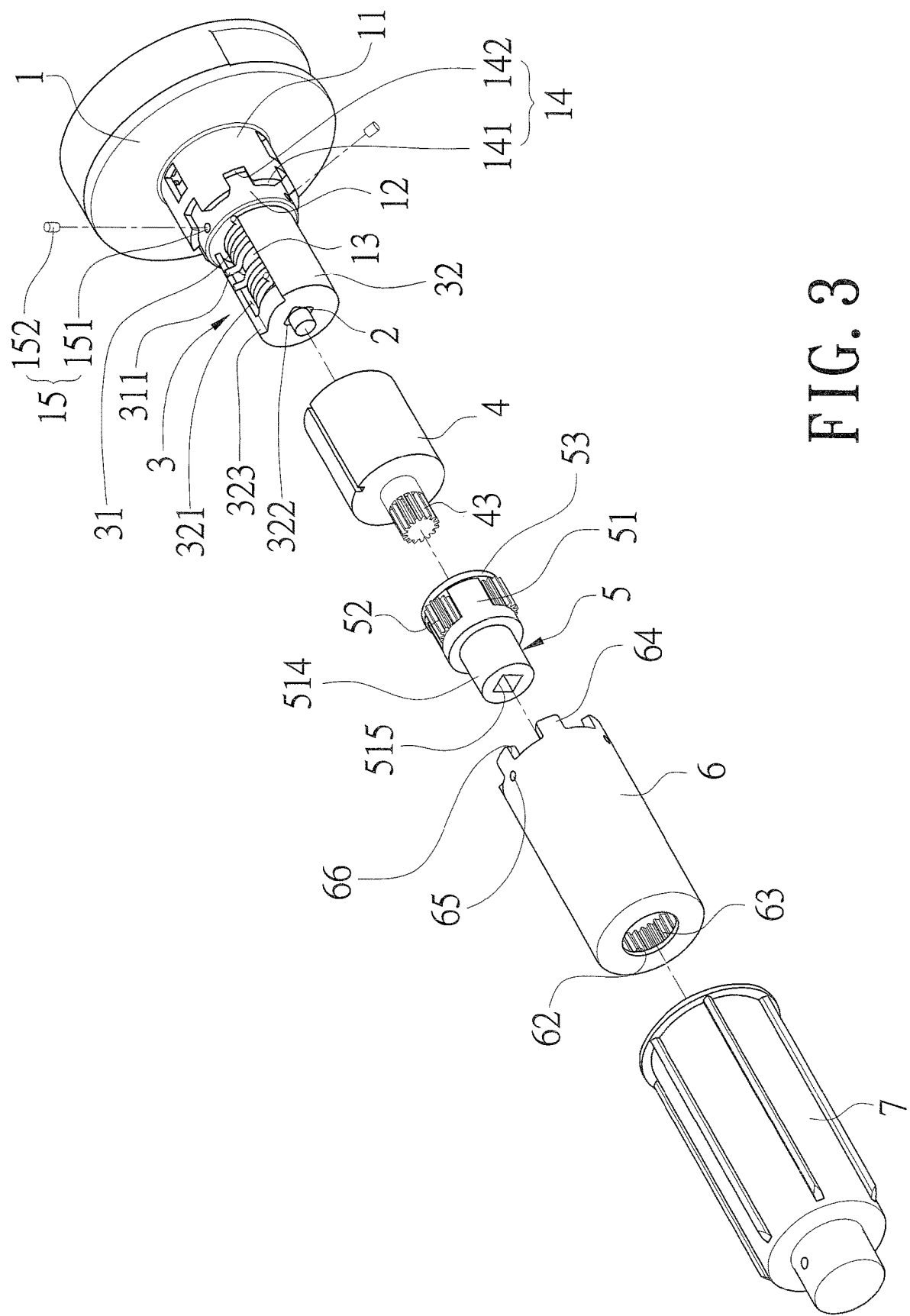
FIG. 3 is a further explosive view of an embodiment according to the present invention.

Refer to FIG. 1, FIG. 2, and FIG. 3, a screwless assembly for control of curtains includes a bead chain base 1, a drive shaft 2, a braking set 3, a first driving member 4, a second driving member 5, a sleeve 6 and a cover 7.

Figure 4:
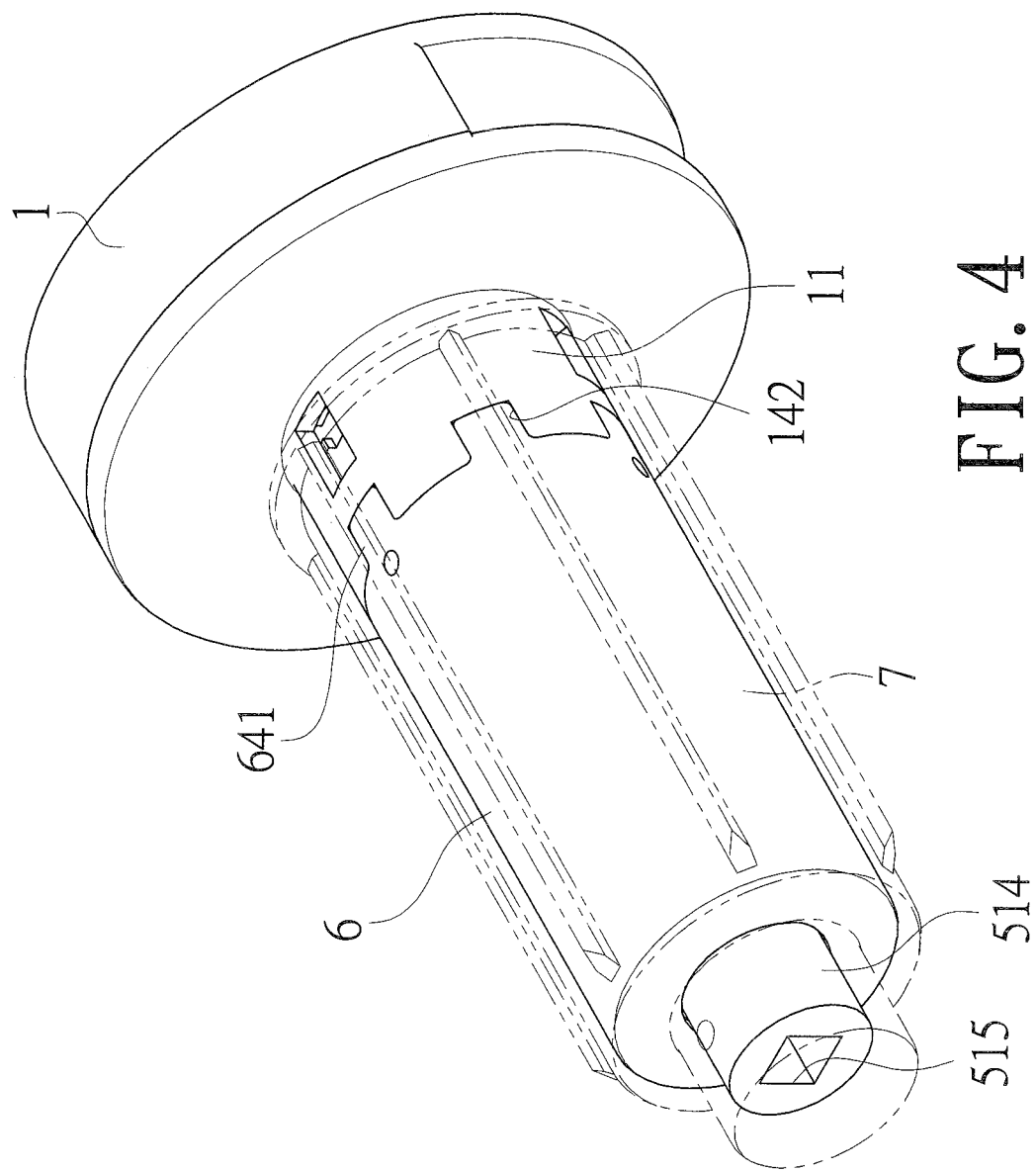
FIG. 4 is a perspective view of an embodiment according to the present invention.
Figure 5:
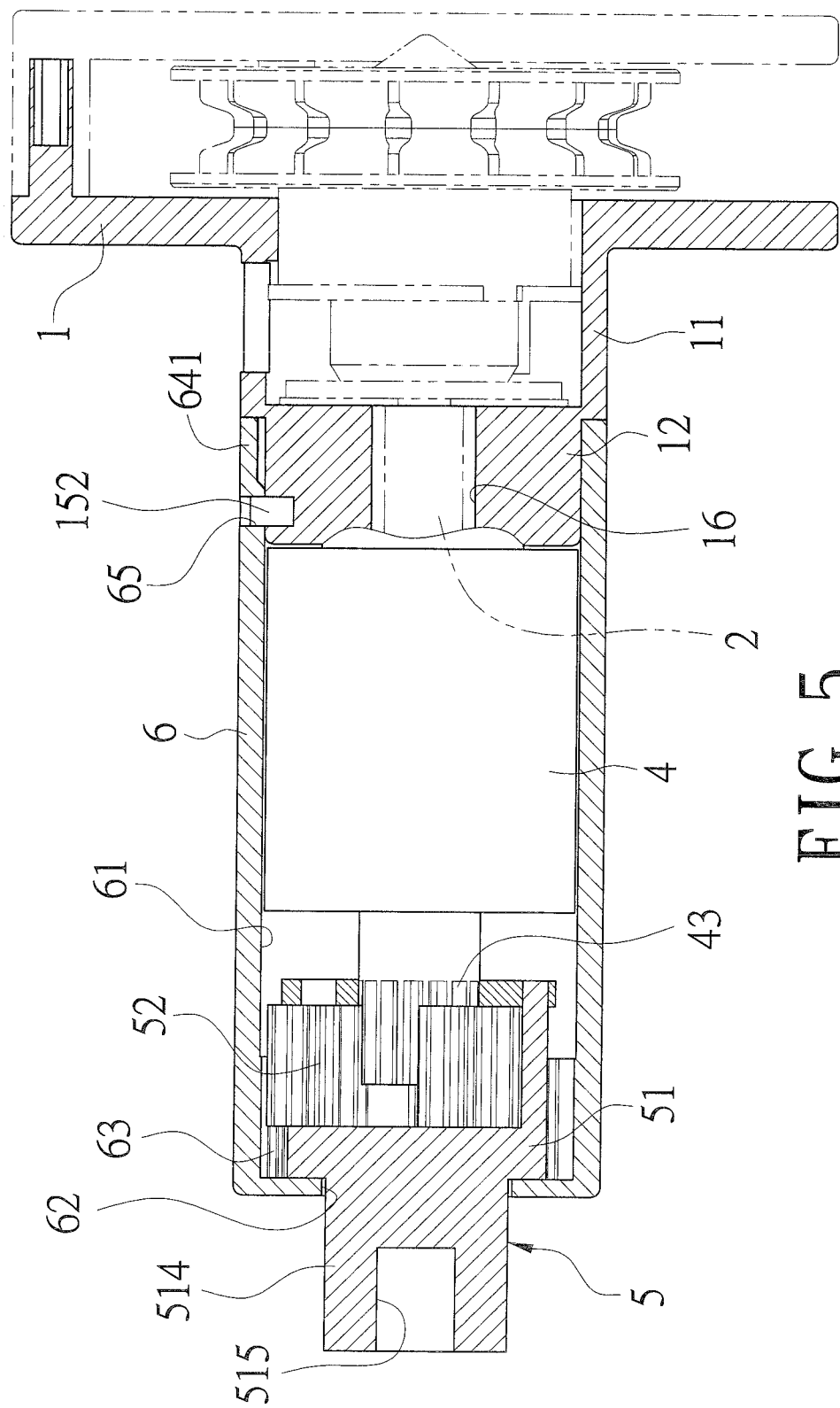
FIG. 5 is a longitudinal sectional view of an embodiment according to the present invention.

The bead chain base 1 consists of a first assembly part 11, a second assembly part 12, a third assembly part 13, a plurality of first radial positioning parts 14, a plurality of first axial positioning parts 15 and a through hole 16. The first assembly part 11, the second assembly part 12, and the third assembly part 13 are connected coaxially in turn and tapered to form a step-like tapered assembly segment on one end of the bead chain base 1. The first radial positioning parts 14 are arranged at the first assembly part 11. Each first radial positioning part 14 includes two opposite pieces 141 connected to the first assembly part 11 and a dovetail groove 142 (as shown in FIG. 4) formed between the two pieces 141. The first axial positioning parts 15 are disposed on the second assembly part 12 adjacent to the first radial positioning parts 14. Each of the first axial positioning part 15 includes an insertion hole 151 and a locking pin 152. The insertion hole 151 is formed on the wall around the second assembly part 12 and corresponding to the dovetail groove 142 of the first radial positioning parts 14 while the locking pin 152 is inserted into the insertion hole 151 and one end of the locking pin 152 is out of the insertion hole 151. The locking pin 152 can be a screw able to be threaded and fixed on the insertion hole 151. The through hole 16 goes through the center of the third assembly part 13, as shown in FIG. 5.

The drive shaft 2 that is a polygonal shaft is passed through the through hole 16 of the bead chain base 1. In this embodiment, the drive shaft 2 is a rectangular shaft.

The braking set 3 is composed of two brake springs 31 and a brake tube 32. The two brake springs 31 that are torsion springs are mounted to the third assembly part 13 of the bead chain base 1, adjacent to each other and each of two ends of the brake spring 31 is bent to form a terminal 311. The brake tube 32 includes a chamber 321 therein, an insertion hole 322 communicated with the chamber 321 and an opening 323 on the side thereof. The third assembly part 13 of the bead chain base 1 and the brake springs 31 are mounted within the chamber 321 of the brake tube 32. An opening of the chamber 321 is located on one end of the brake tube 32 while the insertion hole 322 is set on the other end of the brake tube 32. The cross section of the insertion hole 322 is polygonal such as rectangular and the insertion hole 322 is aligned with the through hole 16 of the bead chain base 1. Thus the drive shaft 2 passed through the through hole 16 of the bead chain base 1 can be inserted through the insertion hole 322 of the brake tube 32. The opening 323 is communicated with the chamber 321 and two terminals 311 of the brake spring 31 are against two sides of the opening 323 for being positioned.

The first driving member 4 includes a first cavity 41, a stopping segment 42 and a toothed bar 43. The first cavity 41 is used for mounting the braking set 3 while the stopping segment 42 is projecting from a side wall of the first cavity 41 lengthwise and located between the two terminals 311 of the brake spring 31 to push against the two terminals 311 of the brake spring 31 correspondingly. An opening of the first cavity 41 is on one end of the first driving member 4 while the toothed bar 43 is connected to the other end of the first driving member 4.

The second driving member 5 consists of an assembly base 51, a plurality of planet gears 52, and a fixing disc 53. The assembly base 51 is composed of a plurality of assembly pieces 511 spaced therearound, a plurality of fixing parts 512 each of which is projecting from a rear end of the corresponding assembly piece 511, a plurality of shafts 513 each of which is disposed on the interval between the two adjacent assembly pieces 511, an assembly end 514 and a polygonal connection hole 515. The planet gear 52 is set on the shaft 513. The fixing disc 53 is formed by a through hole 531 at a center thereof, a plurality of first fixing holes 532 and a plurality of second fixing holes 533. The first fixing holes 532 and the second fixing holes 533 are disposed around the through hole 531 alternately with an interval between the two adjacent fixing holes 532, 533. The toothed bar 43 of the first driving member 4 is passed through the through hole 531 of the fixing disc 53 so that the fixing disc 53 is attached to the end of the first driving member 4 with the toothed bar 43. The fixing parts 512 on the assembly base 51 are plugged into the first fixing holes 532 of the fixing disc 53 respectively while an end of each shaft 513 is inserted into the second fixing hole 533 correspondingly. Thus the toothed bar 43 of the first driving member 4 is located among the plurality of planet gears 52 and engaged with a toothed part formed by teeth on the inner side of the respective planet gear 52. The assembly end 514 is set on one end of the assembly base 51, opposite to the end of the assembly base 51 with the planet gears 52. The polygonal connection hole 515 is formed on one end of the assembly end 514 and the cross section of the connection hole 515 is rectangular.

Figure 6:
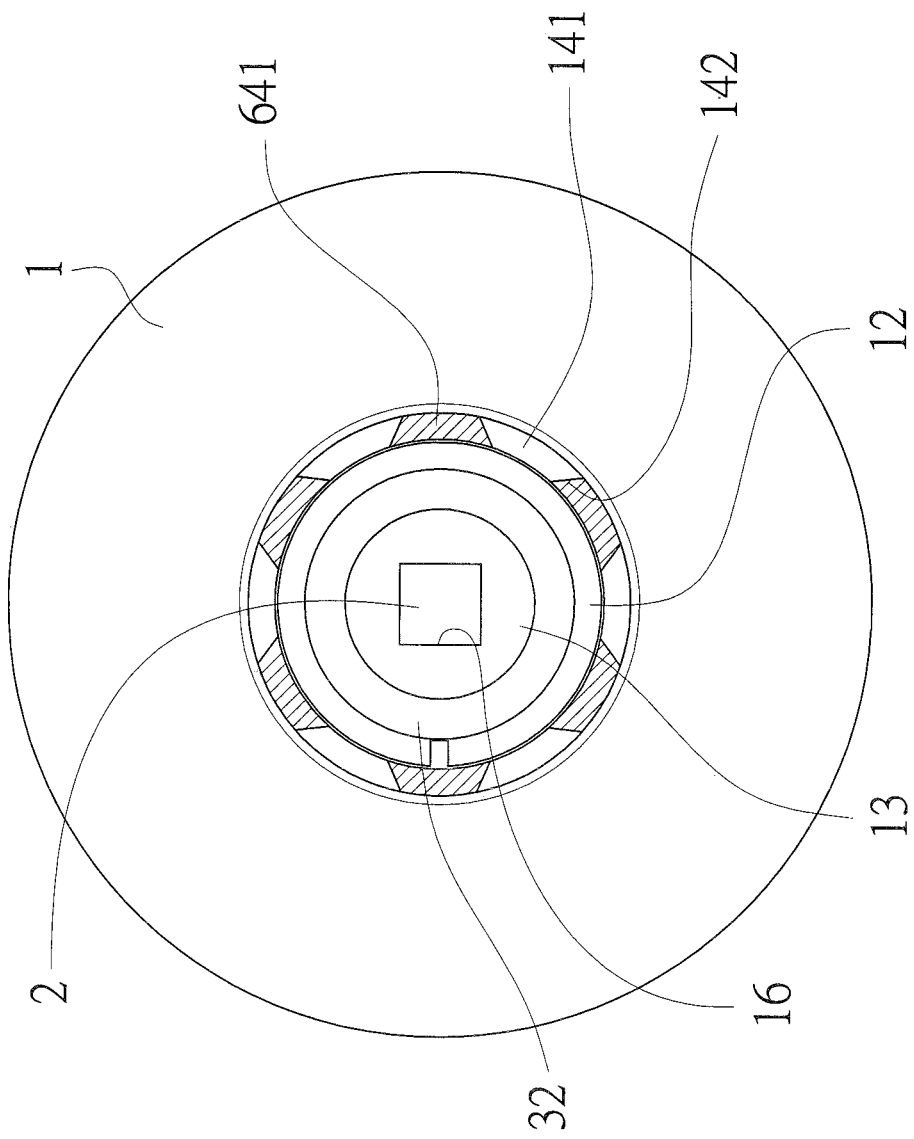
FIG. 6 is a cross sectional view of an embodiment according to the present invention.

The sleeve 6 is composed of a second cavity 61, a through hole 62 located on a center of the bottom of the second cavity 61 and communicated with the second cavity 61, an internally-toothed annular portion 63 formed on a wall of the second cavity 61 and located adjacent to the bottom of the second cavity 61, a plurality of second radial positioning parts 64 projecting from one end thereof with an opening of the second cavity 61, a plurality of second axial positioning parts 65, and a plurality of indentations 66 formed between the two adjacent second radial positioning parts 64. The first driving member 4 and the second driving member 5 are mounted within the second cavity 61. The assembly end 514 of the second driving member 5 is extended from the through hole 62. A plurality of teeth on the outer side of the planet gears 52 of the second driving member 5 is engaged with the internally-toothed annular portion 63 on the wall of the second cavity 61 of the sleeve 6. The second radial positioning part 64 consists of a dovetail piece 641, a guiding groove 642 and a guiding slope 643. As shown in FIG. 4 and FIG. 6, the dovetail piece 641 is connected to and engaged with the dovetail groove 142 of the first radial positioning part 14 of the bead chain base 1 correspondingly. The second axial positioning part 65 is a locking hole arranged at the wall of the second cavity 61 of the sleeve 6, corresponding to the dovetail piece 641 of the second radial positioning part 64. The guiding groove 642 is formed on the inner surface of the dovetail piece 641 of the second radial positioning part 64 and is extended from the rear end of the dovetail piece 641 to the second axial positioning part 65 along the long side of the second radial positioning part 64. The guiding slope 643 is formed on the wall at one end of the guiding groove 642 adjacent to the second axial positioning part 65. Thus the locking pin 152 of the first axial positioning part 15 is passed through the guiding groove 642 and guided by the guiding slope 643 to be mounted within and positioned by the second axial positioning part 65 that is a locking hole. The indentation 66 formed between the two adjacent dovetail pieces 641 of the second radial positioning parts 64 is connected to and engaged with the piece 141 of the first radial positioning part 14 of the bead chain base 1.

The cover 7 includes a third cavity 71 therein and a polygonal connecting pin 72 projecting from a center of the bottom of the third cavity 71. The third cavity 71 is used for mounting the sleeve 6 therein while the connecting pin 72 is plugged in and connected to the connection hole 515 on the assembly end 514 of the second driving member 5. The cross section of the polygonal connecting pin 72 is rectangular.

Refer to FIG. 4 and FIG. 5, while being assembled, the first locking pins 152 of the first axial positioning part 15 are inserted into the insertion holes 151 on the second assembly part 12 of the bead chain base 1 respectively. Then the two brake springs 31 of the braking set 3 are set around the third assembly part 13 of the bead chain base 1 and then mounted within the chamber 321 of the brake tube 32 while the terminals 311 on the two ends of the brake spring 31 are against two sides of the opening 323 of the brake tube 32 for being positioned. Next the first cavity 41 of the first driving member 4 is fit on and connected to the brake tube 32 while the stopping segment 42 on the side wall of the first cavity 41 of the first driving member 4 is located between the terminals 311 on two ends of the brake springs 31 respectively to push against the two terminals 311 of the brake spring 31 correspondingly. Then the toothed bar 43 of the first driving member 4 is arranged among the planet gears 52 of the second driving member 5 and engaged with the toothed part formed by teeth on the inner side of the respective planet gear 52. Later the first driving member 4 and the second driving member 5 are mounted in the second cavity 61 of the sleeve 6 and the assembly end 514 of the second driving member 5 is extended from the through hole 62 of the sleeve 6. The dovetail pieces 641 of the second radial positioning parts 64 of the sleeve 6 are connected to and engaged with the dovetail grooves 142 on the first radial positioning parts 14 of the bead chain base 1, as shown in FIG. 6. At the same time, the locking pin 152 on the first axial positioning part 15 of the bead chain base 1 reaches the rear end of the guiding groove 642 under guidance of the guiding groove 642 on the inner surface of the dovetail pieces 641 of the second radial positioning parts 64. Then the locking pin 152 of the first axial positioning part 15 is further guided by the guiding slope 643 to be locked in and positioned by the second axial positioning parts 65 (the locking holes) of the sleeve 6. As to the planet gears 52 of the second driving member 5, teeth on an outer side thereof are engaged with the internally-toothed annular portion 63 on the wall of the second cavity 61 of the sleeve 6. Then the drive shaft 2 is passed through the through hole 16 of the bead chain base 1 and the insertion hole 322 of the brake tube 32. Next the sleeve 6 is mounted within the third cavity 71 of the cover 7 and the connecting pin 72 on the bottom of the third cavity 71 of the cover 7 is plugged in and connected to the connection hole 515 on the assembly end 514 of the second driving member 5 extended from the sleeve 6. Lastly the other end of the drive shaft 2 is connected to a bead chain roller and the cover 7 is mounted to a curtain rod.

While in use, the drive shaft 2 is driven to rotate by the bead chain roller when a bead chain cord is pulled. Then the brake tube 32 is driven to rotate by the rotating drive shaft 2 and the terminal 311 on one end of the brake spring 31 is pushed by one side of the opening 323 of the brake tube 32 to untwist the brake spring 31 around the third assembly part 13 of the bead chain base 1. Thus the brake spring 31 rotates with the brake tube 32. During rotation of the brake spring 31, the terminals 311 of the brake spring 31 push against the stopping segment 42 of the first driving member 4 for driving the first driving member 4 to rotate. Then the planet gears 52 of the second driving member 5 are driven to rotated owing to the toothed bar 43 of the rotating first driving member 4 engaged with the planet gears 52 of the second driving member 5. Under guidance of the engaged internally-toothed annular portion 63, the planet gears 52 drives the assembly base 51 to rotate at a different speed. At the same time, the cover 7 connected to the connection hole 515 on the assembly end 514 of the second driving member 5 also rotates at a different speed. Thereby a curtain on a curtain rod connected to the cover 7 is retracted or extended easier with less effort. When the planet gears 52 rotate under guidance of the internally-toothed annular portion 63 of the sleeve 6, the planet gears 52 give the sleeve 6 a counter-clockwise torque. The two opposite sides of the dovetail piece 641 of the second radial positioning part 64 of the sleeve 6 and of the dovetail groove 142 of the first radial positioning part 14 of the bead chain base 1 in contact with each other include an upper side and a lower side that is wider than the upper side, as shown in FIG. 6. This design prevents the dovetail piece 641 of the second radial positioning part 64 of the sleeve 6 from being radially released from the dovetail groove 142 of the first radial positioning part 14 of the bead chain base 1 and further avoids improper rotation of the sleeve when a torque is applied to the sleeve 6. Moreover, no axial displacement can take place once the sleeve 6 and the bead chain base 1 are connected to each other owing to the locking pin 152 on the second assembly part 12 of the bead chain base mounted in and positioned by the second axial positioning part 65 that is a locking hole of the sleeve 6. Thereby the sleeve 6 and the bead chain base 1 are connected firmly. The time consuming disadvantage of the conventional curtain control assembly caused by fastening screws one by one can be overcome. Not only the time spent on fastening the screws, the cost of the screws is also saved. The modern industry's demand for high productivity at low cost can be met.

In summary, the present invention has the following advantages:

1. The screwless curtain control assembly according to the present invention can be modified according to width and size of curtain fabric. The second driving member without speed changing is connected to the toothed bar of the first driving member while the present invention being assembled with small-size curtain fabric. When the curtain fabric is large size and heavy, planet gears of another second driving member are engaged with the toothed bar of the first driving member and then the sleeve is mounted in the groove of the first assembly part of the bead chain base for fixing the assembly of the first driving member with the second driving member therein. The sleeve and the bead chain base are connected without screws so that assembly time required during production is reduced efficiently and the shipping efficiency of curtains is increased.

2. The present screwless curtain control assembly can be applied to various window curtains and blinds. A cover is fit on the sleeve so that the connecting pin of the cover is plugged in and connected to the connection hole on the assembly end of the second driving member when the screwless curtain control assembly is applied to a roller blind or Roman shade. Thus the present assembly is connected to a curtain rod by the cover for drawing the roller blind or Roman shade. While being applied to a Venetian blind, the assembly end of the second driving member extended from the sleeve and arranged with the connection hole is connected to a shaft of a reel of the Venetian blind for opening or closing the Venetian blind.

3. The first radial positioning part of the bead chain base is arranged with a dovetail groove while the second radial positioning part of the sleeve is provided with a dovetail piece. Thereby the dovetail piece of the second radial positioning part of the sleeve will not be released from the dovetail groove of the first radial positioning part of the bead chain base when a torque is applied to the sleeve due to dovetail connection therebetween. Thus improper rotation of the sleeve will not occur.

4. The screwless curtain control assembly of the present invention can be used in combination with the curtain rod having smaller size without the volume required for fasteners such as screws. While being applied to the curtain rod with normal size, the size of the driving members can be increased for loading the heavier curtain fabric with large size and eliminating the problems such as rotational resistance, damaged parts, etc.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A screwless curtain control assembly comprising:
   a bead chain base that includes an assembly segment on one end thereof,
      a plurality of first radial positioning parts disposed on the assembly segment, and
      a plurality of first axial positioning parts arranged at the assembly segment while the first radial positioning parts and the first axial positioning parts are set alternately;
   a first driving member fit on the assembly segment and having a toothed bar connected to one end thereof;
   a second driving member that includes a toothed part engaged with the toothed bar of the first driving member, and an assembly end affixed thereof; and
   a sleeve that includes a second cavity for mounting the first driving member and the second driving member therein,
      a through hole located on a bottom of the second cavity of the sleeve and used for allowing the assembly end of the second driving member to pass through to be extended from the sleeve,
      a plurality of second radial positioning parts disposed on one end thereof with an opening of the second cavity of the sleeve and engaged with and positioned by the first radial positioning parts of the bead chain base respectively, and
      a plurality of second axial positioning parts that are arranged adjacent to the second radial positioning parts and engaged with and positioned by the first axial positioning parts of the bead chain base respectively.

2. The assembly as claimed in claim 1, wherein the first radial positioning part of the bead china base includes two opposite pieces and a dovetail groove formed between the two pieces while the second radial positioning part of the sleeve is provided with a dovetail piece projecting from one end of the sleeve with the opening of the second cavity; the dovetail pieces of the second radial positioning part of the sleeve is mounted in and engaged with the dovetail groove of the first radial positioning part of the bead chain base correspondingly; an indentation is formed between the two adjacent dovetail pieces of the second radial positioning parts of the sleeve and the dovetail piece of the first radial positioning part of the bead chain base is engaged with the indentation.

3. The assembly as claimed in claim 2, wherein the first axial positioning part of the bead chain base includes a locking pin arranged at the assembly segment of the bead chain base while the second axial positioning part of the sleeve is a locking hole disposed on a wall of the sleeve; the locking pin of the bead chain base is mounted within the second axial positioning part of the sleeve to be positioned.

4. The assembly as claimed in claim 3, wherein the second axial positioning part of the sleeve, a locking hole, is corresponding to the dovetail piece of the second radial positioning part of the sleeve; a guiding groove is formed on an inner surface of the dovetail piece and is extended from a rear end of the dovetail piece to the second axial positioning part along the direction of the long side of the dovetail piece; a guiding slope is disposed on a wall at one end of the guiding groove adjacent to the second axial positioning part; thus the locking pin is passed through the guiding groove and guided by the guiding slope to be mounted in and positioned by the second axial positioning part.

5. The assembly as claimed in claim 1, wherein the second driving member includes an assembly base and a plurality of planet gears disposed around the assembly base; the toothed bar of the first driving member is located at a center of the planet gears and teeth on an inner side of the respective planet gear form the toothed part engaged with the toothed bar of the first driving member; an internally-toothed annular portion is formed on a wall of the second cavity of the sleeve and engaged with teeth on an outer side of the planet gears; the assembly end is set on one end of the assembly base, opposite to the end with the planet gears and is passed through the through hole on the bottom of the second cavity to be extended from the sleeve.

6. The assembly as claimed in claim 5, wherein the second driving member further includes a fixing disc; the assembly base includes a plurality of assembly pieces spaced therearound, a plurality of fixing parts each of which is projecting from a rear end of the corresponding assembly piece, a plurality of shafts each of which is disposed on an interval between the two adjacent assembly pieces, and the assembly end; the planet gears are mounted to the shafts respectively; the fixing disc includes a through hole at a center thereof, a plurality of first fixing holes and a plurality of second fixing holes; the first fixing holes and the second fixing holes are disposed around the through hole alternately with an interval between the adjacent first and second fixing holes; the toothed bar of the first driving member is passed through the through hole of the fixing disc to engage with the planet gears and make the fixing disc attach to the end of the first driving member with the toothed bar; the fixing parts on the assembly pieces of the assembly base are plugged into the first fixing holes of the fixing disc respectively while an end of the respective shaft is inserted and positioned in the second fixing hole correspondingly.

7. The assembly as claimed in claim 1, wherein the assembly segment of the bead chain base includes a plurality of assembly parts coaxially arranged, connected in turn and having successive smaller diameters; the first radial positioning parts and the first axial positioning parts are respectively disposed on the first assembly part and the second assembly part with the first assembly part being of larger diameter than the second assembly part and a braking set is arranged at the assembly part with the smallest diameter; the braking set includes two brake springs and a brake tube; the brake springs are set around the assembly part with the shortest diameter and each of two ends of the brake spring is bent to form a terminal; a chamber is formed in the brake tube for mounting the assembly part with the shortest diameter of the bead chain base and the brake springs of the braking set therein; an opening is formed on one side of the brake tube and communicated with the chamber; the two terminals of the brake spring are against two sides of the opening respectively for being positioned; a first cavity is formed in the first driving member and used for mounting the braking set therein; a stopping segment is projecting from a side wall of the first cavity lengthwise and located between the two terminals of the brake spring to push against the two terminals of the brake spring correspondingly.

8. The assembly as claimed in claim 1, wherein a polygonal connection hole is set on one end of the assembly end of the second driving member.

* * * * *